(12) United States Patent
Fukumoto et al.

(10) Patent No.: US 6,290,283 B1
(45) Date of Patent: Sep. 18, 2001

(54) DRIVE DEVICE FOR VEHICULAR SLIDE DOORS

(75) Inventors: Ryoichi Fukumoto, Nagoya; Katsuhisa Yamada, Toyota; Masao Ohhashi, Kariya; Shintaro Suzuki, Kasugai; Seiichi Suzuki, Aichi-ken; Kenji Kobashi, Toyota; Shingo Shoudou, Sanda; Kenichi Shibata, Itami, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/461,233

(22) Filed: Dec. 16, 1999

(30) Foreign Application Priority Data

Dec. 22, 1998 (JP) .................................................. 10-364665

(51) Int. Cl.[7] ...................................................... B60J 5/06
(52) U.S. Cl. ......................... 296/155; 296/151; 296/202; 49/213
(58) Field of Search ..................................... 296/155, 202, 296/151; 49/360, 213, 215, 212, 216

(56) References Cited

U.S. PATENT DOCUMENTS

| | | | |
|---|---|---|---|
| 5,140,316 | * | 8/1992 | Deland et al. ................... 296/155 X |
| 5,178,435 | * | 1/1993 | Anderson ............................. 296/208 |
| 5,836,639 | * | 11/1998 | Kleefeldt et al. .................... 296/155 |
| 5,896,704 | * | 4/1999 | Neag et al. ...................... 296/155 X |
| 5,967,595 | * | 10/1999 | Heya et al. ........................... 296/155 |
| 6,079,767 | * | 6/2000 | Faubert et al. ....................... 296/155 |
| 6,089,649 | * | 7/2000 | Hamada et al. ..................... 296/155 |

FOREIGN PATENT DOCUMENTS

| | | | |
|---|---|---|---|
| 0014520 | * | 1/1994 | (JP) ..................................... 296/155 |
| 10-936 | | 9/1998 | (JP) . |

\* cited by examiner

*Primary Examiner*—D. Glenn Dayoan
*Assistant Examiner*—Lori L. Coletta
(74) *Attorney, Agent, or Firm*—Burns, Doane, Swecker & Mathis, LLP

(57) ABSTRACT

An electricity feeding device for a vehicle slide door includes a flexible conductive portion for electrically coupling components in the slide door and the vehicle body. The flexible conductive portion has a curved portion which is fitted in a groove so that at least one portion of the flexible conductive portion is spaced a distance from a wall of the groove. The curved portion moves in the groove in association with movement of the slide door for opening or closing an opening area formed in the side wall of the vehicle body.

16 Claims, 7 Drawing Sheets

US 6,290,283 B1

DRIVE DEVICE FOR VEHICULAR SLIDE DOORS

This application is based on and claims priority under 35 U.S.C. §119 with respect to Japanese Application No. 10(1998)-364665 filed on Dec. 22, 1998, the entire content of which is incorporated herein by reference.

FIELD OF THE INVENTION

The present invention is generally directed to a vehicle slide door. More particularly, the present invention pertains to an electricity feeding device which establishes an electric coupling between components in a vehicle slide door and a vehicle body.

BACKGROUND OF THE INVENTION

Japanese Patent Laid-Open Publication No. Hei.10-936, published on Jan. 6, 1998 without examination, discloses an electricity feeding device for a vehicle slide door that includes a flexible conductive portion which establishes an electric coupling between components in the slide door and the vehicle body, respectively. The flexible conductive portion is configured to have a curved or U-shaped portion which is displaced with movement of the slide door for opening or closing the opening area formed in the side wall of a vehicle body.

In this known electricity feeding device, due to the fact that the flexible conductive portion possesses a thin rectangular shaped cross-section, the formation of the U-shaped portion in the flexible conductive portion causes an elastic restoring force which expands the curved portion of the flexible conductive portion in the outward direction. To prevent such an outward expansion, the curved portion of the flexible conductive portion is slidably fitted in a guide groove.

However, when the slide door is in its fully opened condition and one or more individuals enter into or exit out of the vehicle through the opening area in the laterals side wall of the vehicle, foreign substances adhered to the individuals' shoes such as small stones and snow may fall into the groove. Thereafter, when the slide door is moved to close the opening area, the foreign substances are held between the wall of the groove and the flexible conductive portion whose curved portion is displaced together with the moving slide door. This may disturb smooth movement of the curved portion of the flexible portion of the electricity feeding device.

Accordingly, a need exists for an electricity feeding device drive that is not as susceptible to the same disadvantages and drawbacks.

SUMMARY OF THE INVENTION

In light of the foregoing, the present invention provides an electricity feeding device for a vehicle slide door that includes a flexible conductive portion for electrically coupling components in the slide door and the vehicle body. The flexible conductive portion has a curved portion which is fitted in a groove of the vehicle body in such manner that at least one portion of the flexible conductive portion is spaced a distance from a wall of the groove. The curved portion moves in conjunction with movement of the slide door for opening or closing an opening area formed in the side wall of the vehicle body.

According to another aspect of the invention, a slide door supporting mechanism provided on a vehicle having a slide door slidably mounted on a vehicle body for movement between an open position and a closed position includes a guide rail secured to the vehicle body and having an open-faced groove, a roller secured to the slide door and fitted in the groove to slide along the groove as the slide door moves between the open position and the closed position, and an electricity feeding device having a flexible conductive portion providing an electrical coupling between components in the slide door and the vehicle body. The flexible conductive portion has a curved portion fitted in the guide rail in such a manner that at least one portion of the flexible conductive portion is spaced a distance from a wall of the guide rail. The curved portion is displaced in the guide rail in association with movement of the slide door between the open position and the closed position.

In accordance with another aspect of the invention, a vehicle slide door apparatus includes a guide rail secured to the vehicle body and having an open-faced groove, a slide door provided with a roller fitted in the groove to slide along the groove as the slide door moves between an open position and a closed position, and an electricity feeding device including a flexible conductive portion providing an electrical coupling between components in the slide door and the vehicle body. The flexible conductive portion has a curved portion fitted in the guide rail that moves in the guide rail in conjunction with movement of the slide door between the open position and the closed position. One end of the flexible conductive portion is connected to a first bracket that is mounted on the slide door and an opposite end of the flexible conductive portion is connected to a second bracket that passes through an opening in a wall portion of the guide rail and is secured to the vehicle body.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
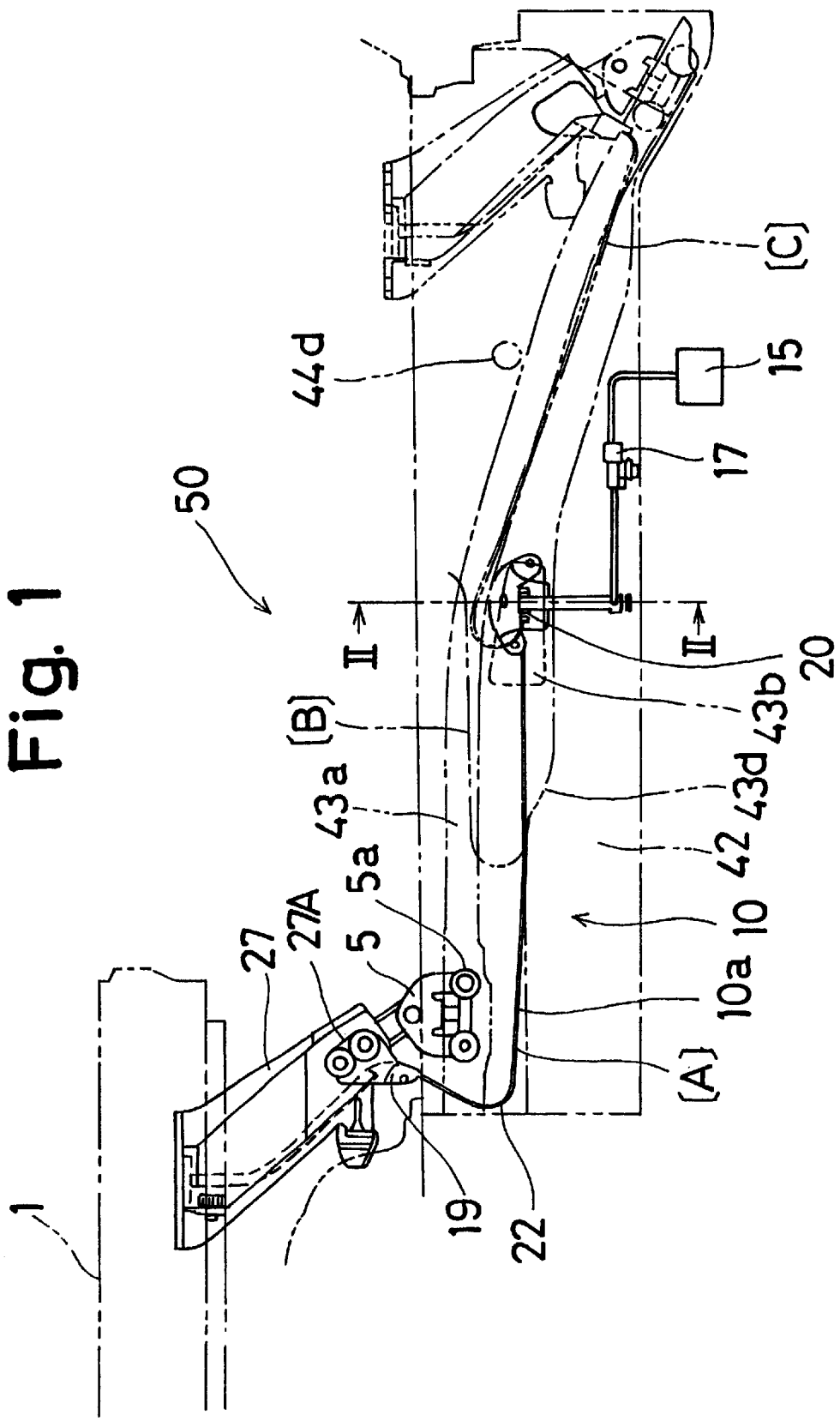
FIG. 1 is a plan view of a portion of a vehicle at which is provided an electricity feeding device according to the present invention.

Referring to FIGS. 1–4, the electricity feeding device 10 of the present invention is adapted to establish an electric coupling between each of a touch sensor 13 and an inside door handle sensor 14 which are provided in a slide door 1, and a CPU 15 provided in the vehicle body. The electricity feeding device 10 includes a flexible conductive portion 10a having a curved portion 22 and operates in such a manner that the curved portion 22 is displaced with movement of the slide door 1.

Before explaining in detail the structural and operational characteristics of the electricity feeding device 10, a description of peripheral or related structure will be set forth.

Figure 6:
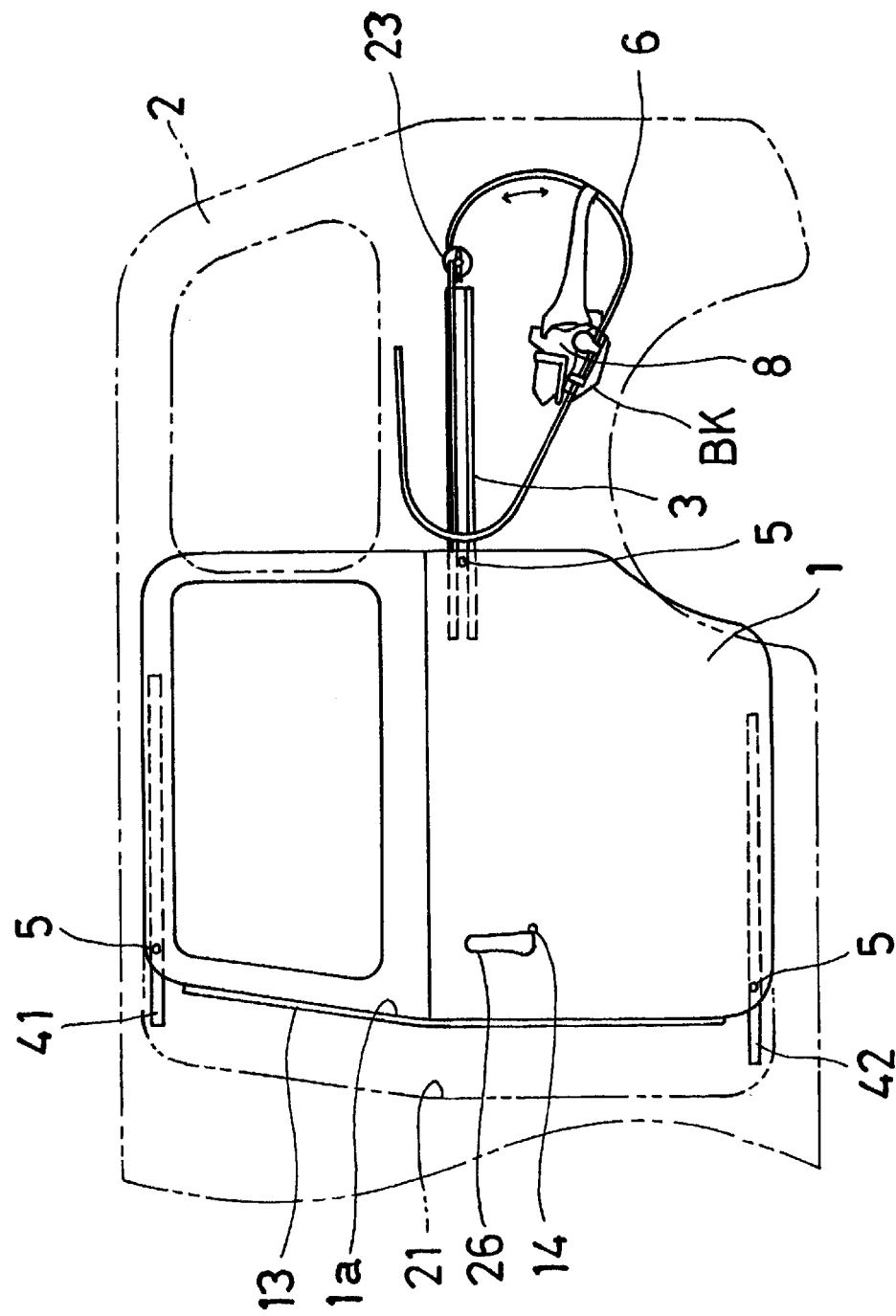
FIG. 6 is a side view of the lateral side of a van type vehicle on which is mounted the slide door.

As shown in FIG. 6, the slide door 1 is movable between an open position and a closed position to open and close an opening area 21 formed in a lateral side wall 2 of a vehicle body. The slide door 1 is guided in the vehicular lengthwise direction (i.e., the right-left direction in FIG. 6) by a center guide rail 3, an upper guide rail 41 and a lower guide rail 42. The upper guide rail 41 is secured to the lateral side wall 2 so that the upper guide rail 41 extends parallel to the upper periphery of the opening 21. The lower guide rail 42 is secured to the lateral side wall 2 so that the lower guide rail 42 extends parallel to the lower periphery of the opening 21. The center guide rail 3 is secured to the lateral side wall 2 at the rear side of the opening 21.

A roller unit 5 is provided at the rear end portion of the slide door 1 and is secured via pin (not shown) with a shoe (not shown) to which a geared cable 6 is connected. The geared cable 6 extends through the lateral side wall into the inner space of the vehicle by way of a grommet 23 located at the rear portion of the center guide rail 3. The geared cable 6 is adapted to move along the center guide rail 3 when driven by a drive unit or actuator which is secured to the inside of the lateral side wall 2. Other roller units 5, 5 are also provided at the front end portions of the slide door 1 as illustrated in FIG. 6. Thus, when the drive unit is turned on in one direction, the slide door 1 moves along the guide rails 3, 41, 42 towards the open position to open the opening area 21. On the other hand, when the drive unit is turned on or operated in the opposite direction, the slide door 1 moves along the guide rails 3, 41, 42 towards the closed position to close the opening area 21.

Figure 2:
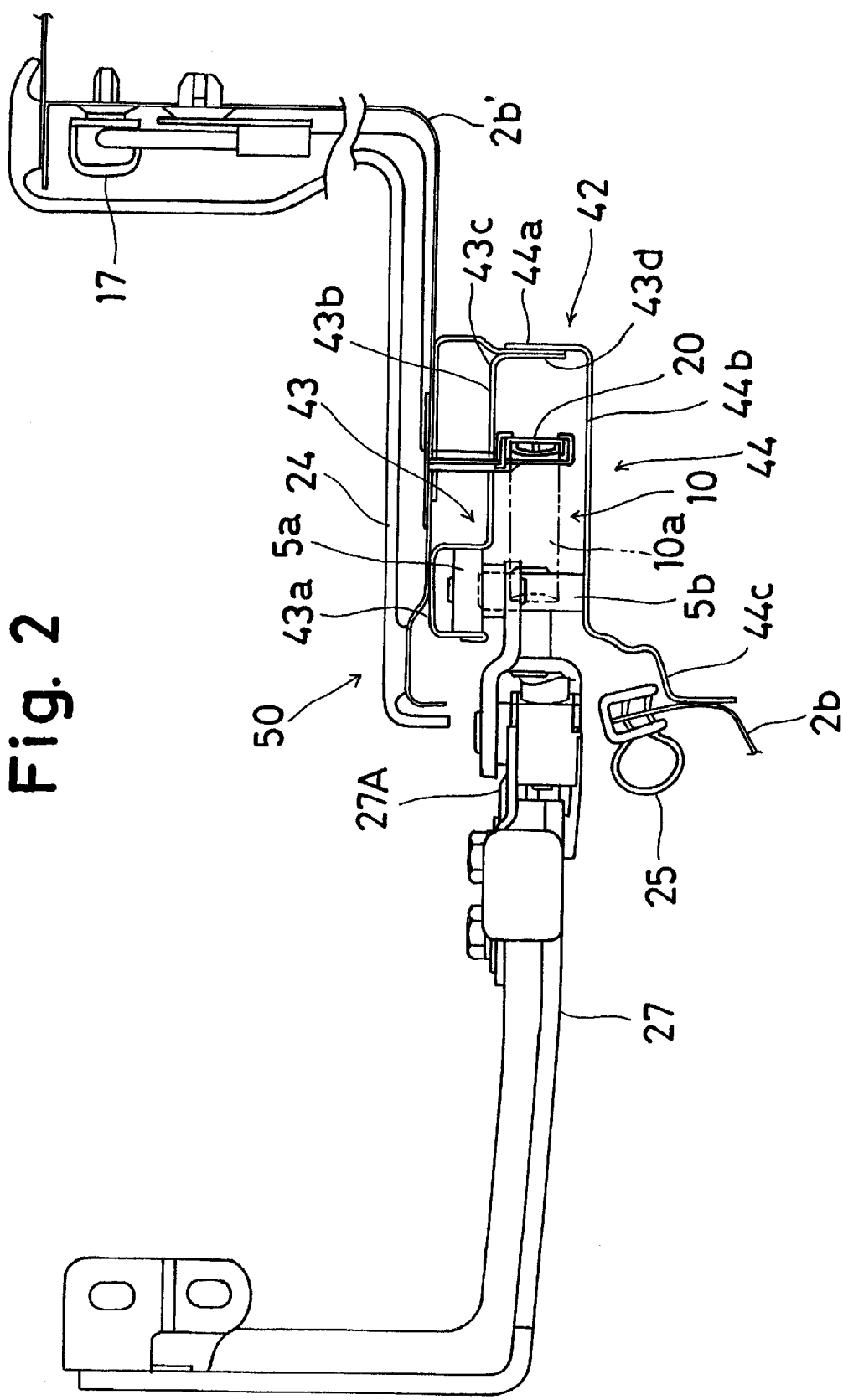
FIG. 2 is a cross-sectional view taken along the section line II—II in FIG. 1.
Figure 3:
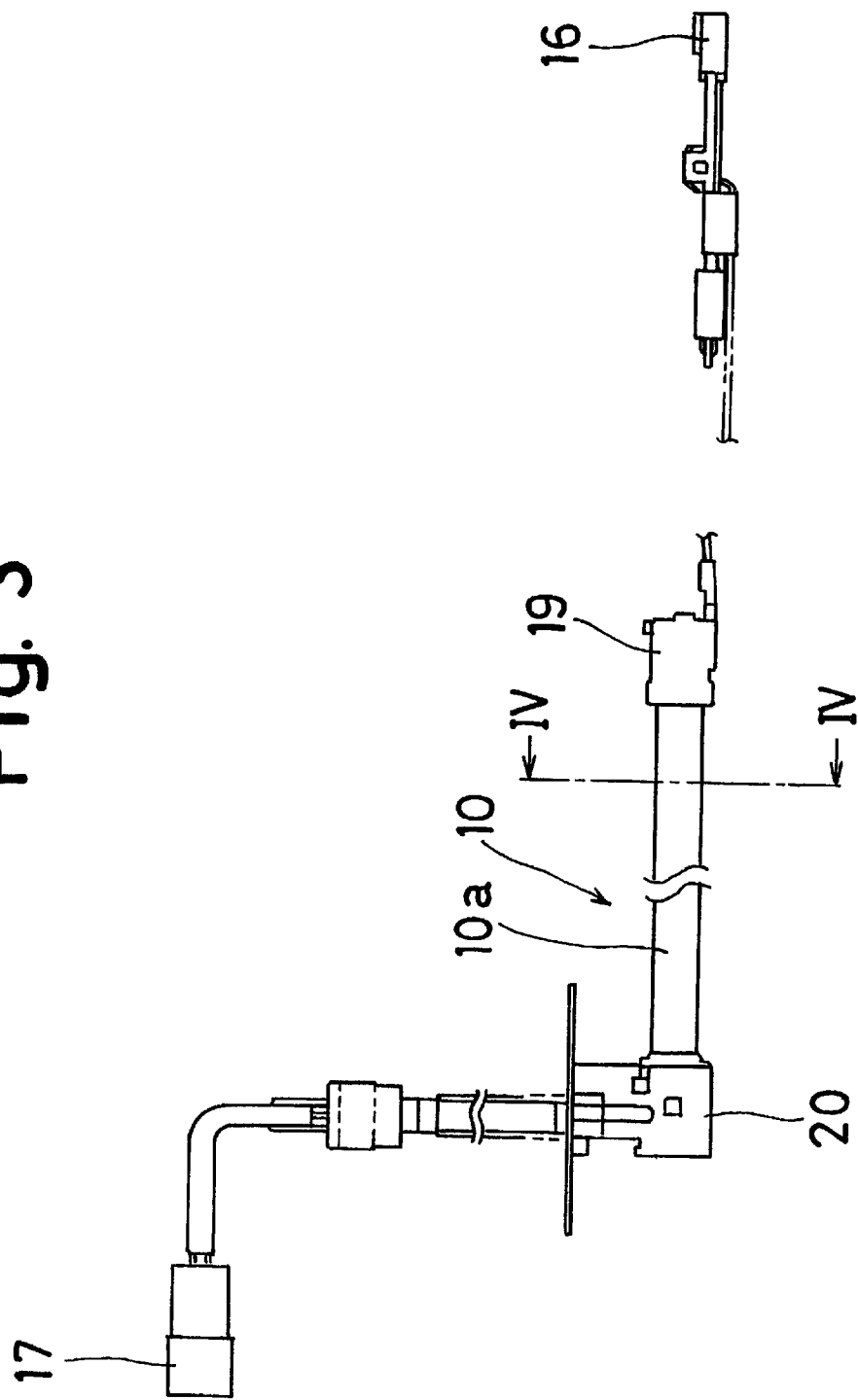
FIG. 3 is a front view of the electricity feeding device according to the present invention.

As shown in FIGS. 1 and 2, a lower arm 27 is interposed between the slide door 1 and the lower guide rail 42. This lower arm 27 establishes sliding movement of the slide door 1 relative to the lower guide rail 42. The lower arm 27 extends from the slide door 1 and terminates in a distal end to which the roller unit 5 is pivoted. A bracket 19 forming a part of the electricity feeding device 10 is secured by a screw (not shown) to a bracket 27A of the lower arm 27 in order that an overlapped relation exists between the roller unit 5 and the bent portion 22 of the flexible conductive portion 10a in the sliding direction of the roller unit 5. Thus, when the slide door 1 is moved for opening and closing the opening 21 in the lateral side wall 2, the roller unit 5 slides in the lower guide rail 42, thus causing sliding movement of the bracket 19 in the lower guide rail 42. Thus, as the bracket 19 changes its position, the bent portion 22 shown in FIG. 1 is displaced or moved. It is to be noted that in FIG. 2, reference numerals 24 and 25 denote a step and a weather strip, respectively.

The slide door 1 is supported by a supporting mechanism 50. The supporting mechanism 50 includes the roller unit 5. The roller unit 5, as best shown in FIG. 2, has a first roller 5a which regulates movement of the slide door 1 in the vehicle lateral direction and a second roller 5b which rolls along the lower guide rail 42 together with movement of the slide door 1.

As shown in FIG. 2, the lower guide rail 42 includes a first lower guide rail 43 and a second lower guide rail 44 which are secured to the vehicle body 2 so as to be positioned at the vehicle body inside 2b' and the vehicle body outside 2b, respectively. The first lower guide rail 43 has a guide groove 43a, an extension wall 43c, and a bent wall 43d. The guide groove 43a is secured to the inside 2a of the vehicle body 2 and guides the first roller 5a in the vehicle lateral direction. The extension wall 43c extends from the guide groove 43a and has a window 43b. The bent wall 43d is a bent structure which bends away from the extension wall 43c in the downward direction.

The second lower rail 44 includes a connection wall 44a secured to the bent wall 43d of the first lower guide rail 43 by spot welding, a rolling wall 44b extending from the connection wall 44a in the vehicle lateral direction and defining a profile along which the second roller 5b rolls, and a mounting wall 44c bending away from the rolling wall 44b in the downward direction. The mounting wall 44c is secured to the outer side 2b of the vehicle body 2b.

The electricity feeding device 10 is mounted in the lower guide rail 42 in the following manner. The bracket 20 at one end of the flexible conductive portion 10a is fixed to the inside 2a of the vehicle body 2 after passing the bracket 20 through the window 43b of the first guide rail 43. The bracket 19 at the other end of the flexible conductive portion 10a is connected to the mounting bracket 27A secured to the slide door 1. As the slide door 1 moves, the roller unit 5 rolls along the guide rail 42, thus causing the bracket 27A to move along the lower guide rail 42. The position of the curved portion 22 is thus displaced or moves.

Figure 7:
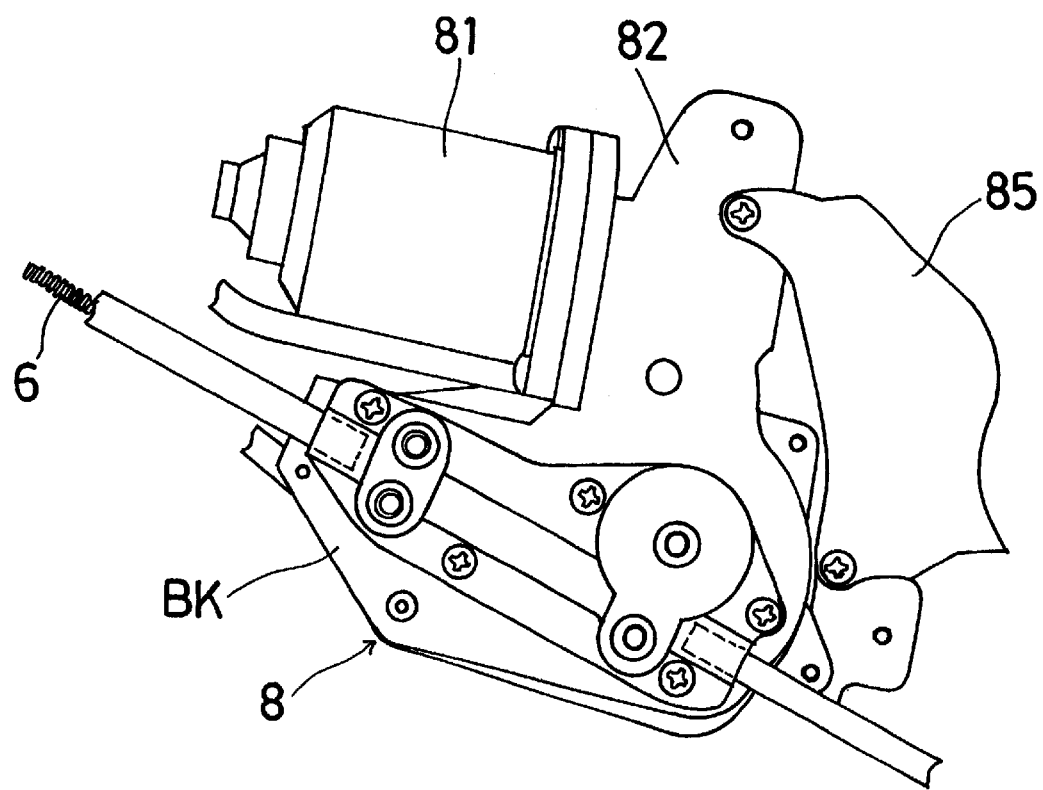
FIG. 7 is a is a side view of the drive device which drives the slide door.

FIG. 7 illustrates the drive device 8 for driving the slide door 1. The drive device 8 is secured by way of a mounting bracket 85 to an inside panel of the lateral side wall 2. The drive device 8 includes a housing 82 in which a speed reduction gear train is accommodated. A motor 81 (e.g., a dc motor) is fixedly mounted on the housing 82 and drives the speed reduction gear train. The drive device 8 also includes a brake device BK which applies a braking force to the geared cable 6 as the cable is moving to adjust the sliding or moving speed of the slide door 1.

When electricity is applied to the motor 82 from a battery by way of an external harness, the motor 82 is turned on in one direction and the resulting rotational torque is transmitted by way of a link mechanism to thereby open the slide door 1. When the motor 82 is applied with electricity from a battery by way of an external harness so that the motor 82 is turned on and operated in the opposite direction, the resulting rotational torque is transmitted by way of the link mechanism to thereby close the slide door 1.

As best shown in FIGS. 1, 4, 5 and 6, the electricity feeding device 10 is used to transmit electric signals from the touch sensor 13 and the inside door handle sensor 14 to the CPU 15. The electricity feeding device 10 also applies electricity to the CPU 15. The CPU 15 controls the sliding movement of the sliding door on the basis of the conditions of an indoor operation switch (not shown) and the electric signals received from both the touch sensor 13 and the inside door handle sensor 14.

The touch sensor 13 is provided along the front vertical end or edge 1a of the slide door area 1 along substantially the full length of the vertical edge and is adapted to detect a sandwiched or pinched condition of an obstacle located between the front vertical periphery of the opening area 21 in the lateral side wall 2 when the slide door 1 is moving towards the closed position for closing the opening area 21. The touch sensor 13 is formed of an electrically conductive elastic material and is configured to posses a hollow structure. The touch sensor 13 is in continual electric coupling with the battery and a fixed amount of current from the battery flows through the touch sensor 13. The amount of current flowing through the touch sensor 13 is outputted, as an electric signal to the CPU 15.

The inside door handle sensor 14 is accommodated in an inside door handle 26 to detect whether or not the inside door handle 26 is manipulated. Only when the inside door handle 26 is manipulated, a current passes through the inside door handle sensor 14 and is detected as an electric signal by the CPU 15.

Figure 4:
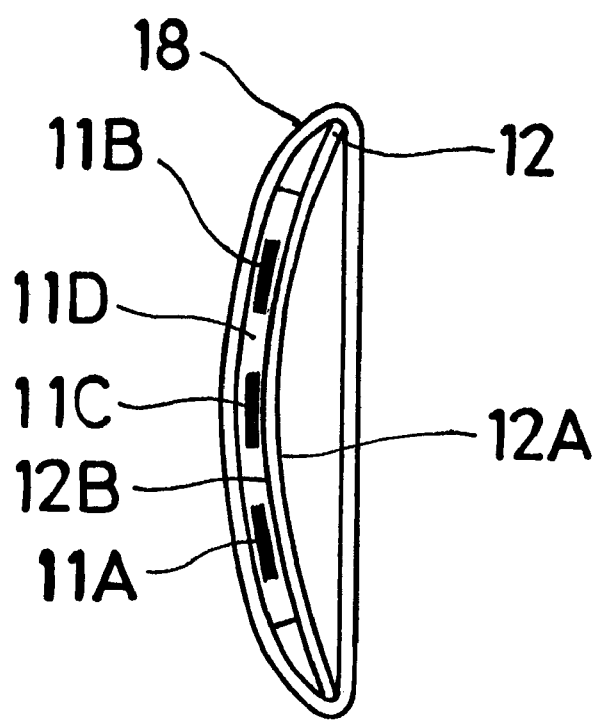
FIG. 4 is a cross-sectional view taken along the section line IV—IV in FIG. 3.
Figure 5:
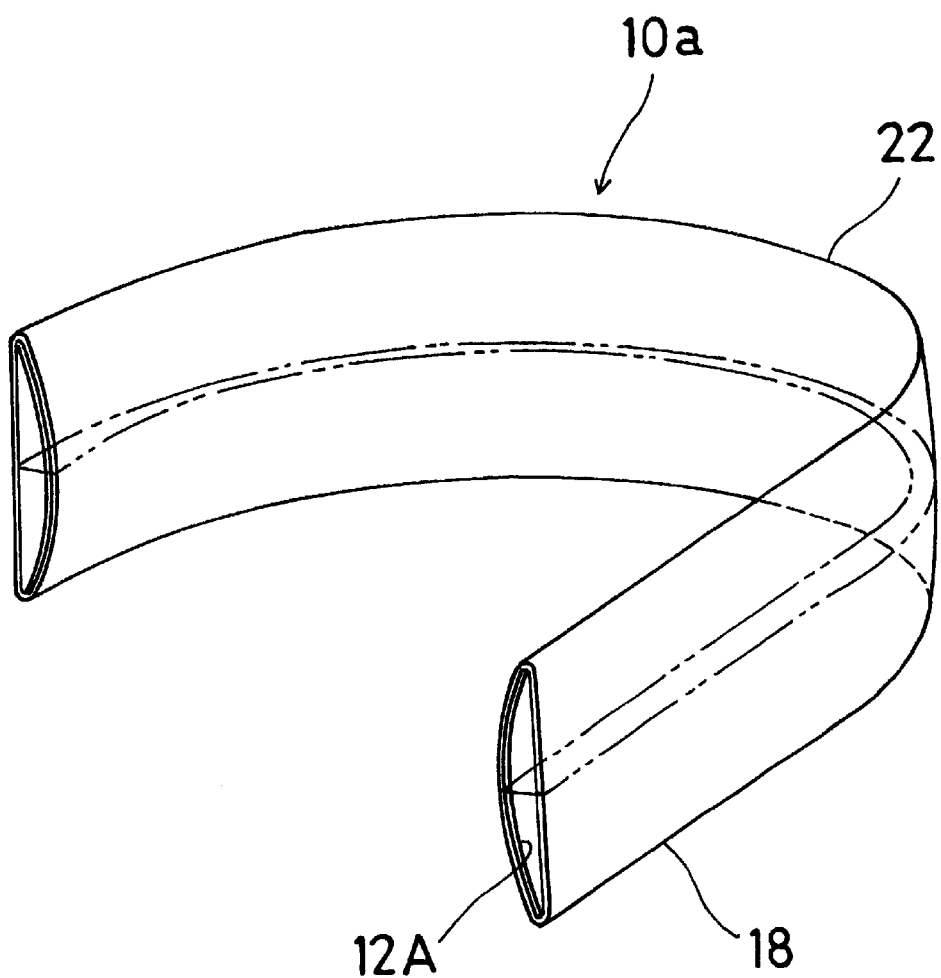
FIG. 5 is a perspective view of the a portion of the electricity feeding device in the region of the bent portion of the flexible conductive portion.

The electricity feeding device 10 includes a flexible conductive portion 10a having independent wires 11A, 11B, 11C, and an insulating member 11D which covers the wires 11A, 11B, 11C. The insulating member 11D in which the wires 11A, 11B, 11C are accommodated possesses a greater widthwise extent than thickness as seen in FIG. 4. The insulating member 11D in which the wires 11A, 11B, 11C are accommodated is supported on an elongated belt 12 which is preferably made of steel. The wire 11A provides an electrical connection between the inside door handle sensor 14 and the CPU 15, the wire 11B provides an electrical connection between the touch sensor 13 and the CPU 15, and the wire 11C provides a common ground for the respective inside door handle sensor 14 and the touch sensor 13. The opposite end portions of the flexible conductive portion 10a is provided with connectors 16, 17. The connector 16 establishes a detachable electric coupling in a single action of one side or end of each of the wires 11A, 11b, 11C to the touch sensor 13, the inside door handle sensor 14, and the CPU 15 respectively. The connector 17 establishes a detachable electric coupling in a single action of one side or end of each of the wires 11A, 11b, 11C to the CPU 15.

In a preferred form of the invention, the belt 12 possesses a thickness of 0.1 mm and is made of tool steel which complies with the Japanese Industrial Standard. The belt 12 may thus be made more rigid than the remainder of the flexible conductive portion 10a. The belt 12 also possesses a width greater than its thickness. As seen in FIG. 4, the belt 12 possesses a curvature as seen in cross-section. That is, the vertical cross-section in the sliding direction of the belt 12 is defined by a convex surface 12B and a concave surface 12A.

The belt 12 and the insulating member 11D in which the wires 11A, 11B, 11C are embedded are accommodated in a tube 18 which may be made of heat shrinkable material. After inserting the belt 12, with the insulating member 11D and wires 11A, 11B, 11C mounted on the belt 12, into the tube, if water warmed at a high temperature is applied to the tube 18, the tube 18 is shrunk, thereby establishing the condition illustrated in FIG. 5. It is to be noted that the tube 18 has an original axial length which is slightly shorter than the longitudinal length of the belt 12 so that each end of the belt 12 projects by a length of about 20 mm from the corresponding end of the tube 18.

A bracket 19 made of resin is provided at and connected to one end of the combined tube 18 and belt 12, and a bracket 20 made of resin is provided at and connected to the other end of the combined tube 18 and belt 12. The bracket 19 is secured to the lower arm 27 of the slide door 1 and the bracket 20 is secured to the upper wall of the lower guide rail 42. The flexible conductive portion 10a turns its extending direction in the bracket 19 and the bracket 20 so as to extend towards both of the touch sensor 13 and the inside door handle sensor 14 and the CPU 15, respectively.

As explained previously, the flexible conductive portion 10a is bent into a substantially U-shaped structure having the curved or bent portion 22 and operates in such a manner that the curved portion 22 is displaced or moved in conjunction with movement of the slide door 1. In FIG. 1, the curved portion 22 of the flexible conductive portion 10a assumes the position designated [A] when the slide door 1 is in its fully opened condition, assumes the position designated [B] when the slide door 1 is at a midway position between its fully open position and its fully closed position, and assumes the position designated [C] when the slide door 1 is in its fully closed condition. Such a position change of the curved portion 22 of the flexible conductive portion 10a is made within a range of the full length of the tube 18. As indicated by the two-dotted line in FIG. 5 which indicates the distance between the tube 18 and the facing surface of the belt 12, at the curved portion, 22 the cross-section of the belt 12 turns to flat from arc-shape. Thus, the distance between the facing surfaces of the tube 18 and the belt 12 is less in the region of the curved portion than in regions of the flexible conductive portion 10a outside the curved portion.

The operation of the slide door and the electricity feeding device is as follows. When the operation switch is turned on to open the slide door 1, an electric signal is fed to the CPU 15. On the basis of this electric signal, the CPU 15 orders the motor 81 to operate, thereby sliding the slide door 1 to the open position. At the time when the slide door 1 is opened, if the inside door handle 26 is manipulated, the inside door handle sensor 14 is activated, thereby feeding an electric signal to the CPU 15. Then, the CPU 15 orders the motor 81 to operate or drive in the reverse direction, thereby moving the slide door 1 to the closed position. If an obstacle is positioned between the vertical inner periphery of the opening area 21 in the lateral side wall 2 and the front vertical periphery 1a of the slide door 1 in motion, the touch sensor 13 deforms and causes an increase in current passing through the touch sensor 13. The resulting current is fed by way of the electricity feeding device 10 to the CPU 15, and the CPU 15 recognizes the occurrence of a sandwiched or pinched condition. The CPU 15 stops the motor 81 and reverses the motor operation 81 to open the slide door 81. Thus, the sandwiched or pinched condition is immediately released.

The flexible conductive portion 10a of the electricity feeding device 10 is interposed between the slide door 1 and the side wall 2 of the vehicle in such a manner that the concave surface 12A of the belt 12 is positioned or faces outside. The curved portion 22 of the flexible conductive portion 10a is displaced or moves in conjunction with movement of the slide door 1 as shown in FIG. 1. In this embodiment, the concave surface 12A and the convex surface 12B of the belt 12 are positioned outside and inside, respectively. This means that the curving direction of the concave surface 12A is against or in opposition to the bending direction of the curved portion 22, which causes an increase in the force to retain or maintain the belt 12 in a straight condition, thereby increasing the force which restricts an outward expansion of the bent portion 22. Thus, in spite of the displacement of the curved portion 22 of the flexible conductive portion 10a in conjunction with the movement of the slide door 1, the curved portion 22 and its adjoining portion is prevented from expanding outwardly. This means that the displacement of the belt 12 occurs under restricted conditions, thereby ensuring that the displacement of the curved portion 22 is made within the width of the brackets 19, 20.

When the slide door is in the fully opened condition, before a person enters into the vehicle body 2 through the opening area 21, the person might likely wipe substances (snow and/or particles) on the bottom of his/her shoes against the step 24. The removed substances fall into the lower guide rail 42 and most of them collect between the roller unit 5 and the flexible conductive portion 10a. When the slide door 1 is moved to close the opening area 21, the curved portion 22 is transferred from [A] to [C] via [B] as seen in FIG. 1, which causes a gradual enclosure of the substances inside the curved portion 22. Such substances are expelled to the outside by falling into a hole 44d formed in the rolling wall 44b as shown in FIG. 1. Even though some substances may be located between the curved portion 22 and the bent wall 43d, a fixed space defined therebetween prevents the curved portion 22 from engaging such substances. The curved portion 22 is thus not damaged.

It is to be noted that in this embodiment, when the slide door 1 is in the fully opened condition as indicated by [A] in FIG. 1, the bent wall 43d and the connection wall 44a are configured to be in engagement with the flexible conductive portion 10a of the electricity feeding device 10. Such a structure thus advantageously increases the stiffness or rigidity of the step 24.

As explained above, the outward expansion of the curved portion 22 of the flexible conductive portion 10a is restricted from expanding outwardly by modifying the cross-section of the belt 12 forming one of the main elements of the flexible conductive portion 10a. Thus, the flexible conductive portion 10a of the electricity feeding device 10 becomes free from sliding engagement with elements defined along its moving path, thereby prolonging the life of the electricity feeding device 10. In addition, restrictions with respect to the positioning of the electricity feeding device are lessened. Moreover, substances falling in the lower rail are not liable to damage the curved portion 22 of the flexible conductive portion 10a.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. An electricity feeding device for a vehicle slide door mounted on a vehicle body comprising:

a flexible conductive portion providing an electrical coupling between components in the slide door and the vehicle body;

the flexible conductive portion having a curved portion which is located in a groove, the flexible conductive portion including one end connected to a bracket fixed with respect to the vehicle body, the bracket being spaced from an inner surface of a wall of the groove so that the flexible conductive portion is spaced a distance from the inner surface of the wall of the groove as the flexible conductive portion is displaced in the groove in association with movement of the slide door for opening or closing an opening area formed in a side wall of the vehicle body.

2. The electricity feeding device as set forth in claim 1, wherein the curved portion of the flexible conductive portion has a fixed width resulting from a self retaining force of the curved portion.

3. The electricity feeding device as set forth in claim 2, wherein the flexible conductive portion includes a wire that effects the electrical coupling between the components, an insulating member in which the wire is accommodated, and a belt on which the insulating member is mounted, said belt having a vertical cross-section with a concave surface.

4. The electricity feeding device as set forth in claim 3, wherein the vertical cross-section of the belt is arc-shaped.

5. The electricity feeding device as set forth in claim 1, wherein the space is not defined when the slide door is in its fully opened condition.

6. The electricity feeding device as set forth in claim 1, wherein the bracket is fixed with respect to the vehicle body so as to extend transversely away from the vehicle body.

7. The electricity feeding device as set forth in claim 6, wherein the bracket passes through a window provided in a guide rail forming a portion of the groove.

8. A slide door supporting mechanism provided on a vehicle having a slide door slidably mounted on a vehicle body for movement between an open position and a closed position, comprising:

a guide rail secured to the vehicle body and having an open-faced groove;

a roller secured to the slide door and fitted in the groove to slide along the groove as the slide door moves between the open position and the closed position; and an electricity feeding device including a flexible conductive portion providing an electrical coupling between components in the slide door and the vehicle body, the flexible conductive portion having a curved portion located in the guide rail and having an end portion secured to a bracket fixed with respect to the vehicle body, the bracket being spaced from an inner surface of a wall of the guide rail so that the flexible conductive portion is spaced a distance from the inner surface of the wall of the guide rail as the flexible conductive portion is displaced in the guide rail in association with movement of the slide door between the open position and the closed position.

9. The slide door supporting mechanism as set forth in claim 8, wherein the curved portion of the flexible conductive portion has a fixed width resulting from a self retaining force of the flexible conductive portion.

10. The slide door supporting mechanism as set forth in claim 9, wherein the flexible conductive portion includes a wire that effects the electrical coupling between the components, an insulating member in which the wire is accommodated, and a belt on which the insulating member is mounted, said belt having a vertical cross-section with a concave surface.

11. The slide door supporting mechanism as set forth in claim 10, wherein the vertical cross-section of the belt is arc-shaped.

12. The slide door supporting mechanism as set forth in claim 10, including a through hole provided in a wall of the guide rail to permit removal of substances in the guide rail.

13. The slide door supporting mechanism as set forth in claim 10, wherein the bracket is fixed with respect to the vehicle body so as to extend transversely away from the vehicle body.

14. The slide door supporting mechanism as set forth in claim 10, wherein the guide rail is a lower guide rail and includes a first lower guide rail and a second lower guide rail that are connected together, the lower guide rail including a guide groove in which is positioned the roller and an extension wall extending from the guide groove.

15. The slide door supporting mechanism as set forth in claim 14, wherein the bracket passes through a window in the extension wall.

16. The slide door supporting mechanism as set forth in claim 8, wherein the space is not defined when the slide door is in its fully opened condition.

* * * * *